United States Patent
Lin et al.

(10) Patent No.: US 9,939,858 B2
(45) Date of Patent: Apr. 10, 2018

(54) ELECTRONIC DEVICE

(71) Applicant: HTC Corporation, Taoyuan (TW)

(72) Inventors: Hung-Wen Lin, Taoyuan (TW);
Hsin-Chih Liu, Taoyuan (TW);
Yu-Jing Liao, Taoyuan (TW); Ya-Lin Hsiao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/596,224

(22) Filed: Jan. 14, 2015

(65) Prior Publication Data

US 2015/0212558 A1 Jul. 30, 2015

Related U.S. Application Data

(60) Provisional application No. 61/929,512, filed on Jan. 21, 2014.

(51) Int. Cl.
*G06F 1/20* (2006.01)

(52) U.S. Cl.
CPC ........ *G06F 1/203* (2013.01); *G06F 2200/201* (2013.01)

(58) Field of Classification Search
CPC .................................. G06F 1/20; G06F 1/203
USPC ........................................ 361/679.54, 679.55
See application file for complete search history.

(56) References Cited

U.S. PATENT DOCUMENTS

| 6,418,017 | B1 | 7/2002 | Patel et al. |
| 7,124,507 | B1 | 10/2006 | Andraka et al. |
| 7,609,520 | B2 * | 10/2009 | Chang ................. F28D 15/0233 165/104.33 |
| 8,018,719 | B2 * | 9/2011 | Busch ................. F28D 15/0233 165/104.33 |
| 2002/0144804 | A1 * | 10/2002 | Liang ...................... F28D 15/02 165/104.33 |
| 2009/0159243 | A1 * | 6/2009 | Zhao ..................... F28D 15/046 165/104.26 |
| 2010/0157533 | A1 * | 6/2010 | Oniki ..................... B21D 53/02 361/700 |
| 2011/0240263 | A1 * | 10/2011 | Yu ....................... F28D 15/0233 165/104.26 |
| 2012/0044635 | A1 * | 2/2012 | Rothkopf ............. G06F 1/1626 361/679.54 |

(Continued)

FOREIGN PATENT DOCUMENTS

| CN | 1878454 | 12/2006 |
| CN | 1982826 | 6/2007 |
| CN | 101232794 | 7/2008 |

(Continued)

OTHER PUBLICATIONS

"Office Action of Taiwan Counterpart Application", dated Feb. 15, 2016, p. 1-p. 8, in which the listed reference was cited.

(Continued)

*Primary Examiner* — Mukund G Patel
(74) *Attorney, Agent, or Firm* — JCIPRNET

(57) ABSTRACT

An electronic device including a case having a space, a circuit board disposed in the space, a heat source disposed on the circuit board and a vapor chamber disposed at a side of the circuit board and adjacent to the heat source is provided. The vapor chamber includes an upper sheet, a bottom sheet assembled with the upper sheet to form a chamber, and a working fluid disposed in the chamber.

13 Claims, 4 Drawing Sheets

(56) References Cited

U.S. PATENT DOCUMENTS

2013/0025829 A1* 1/2013 Huang ............... F28D 15/046
165/104.26

FOREIGN PATENT DOCUMENTS

| CN | 102778157 | 11/2012 |
|----|-----------|---------|
| CN | 202836286 | 3/2013 |
| TW | 201339814 | 10/2013 |
| TW | M463489 | 10/2013 |
| TW | M469525 | 1/2014 |
| TW | M469730 | 1/2014 |

OTHER PUBLICATIONS

"Office Action of Taiwan Counterpart Application", dated May 20, 2016, p. 1-p. 6, in which the listed references were cited.
"Office Action of Taiwan Counterpart Application," dated May 11, 2017, p. 1-p. 5, in which the listed references were cited.
"Office Action of China Counterpart Application," dated Apr. 17, 2017, p. 1-p. 7, in which the listed references were cited.
"Office Action of China Counterpart Application," dated Oct. 9, 2017, p. 1-p. 7, in which the listed references were cited.

* cited by examiner

ELECTRONIC DEVICE

CROSS-REFERENCE TO RELATED APPLICATION

This application claims the priority benefits of U.S. provisional application Ser. No. 61/929,512, filed on Jan. 21, 2014. The entirety of the above-mentioned patent application is hereby incorporated by reference herein and made a part of this specification.

BACKGROUND OF THE INVENTION

1. Field of the Invention

The invention relates to an electronic device, and relates particularly to an electronic device in which a vapor chamber is utilized.

2. Description of Related Art

In recent years, along with the increasing developments of the industrial technology industry, information products, for example, notebook computers, tablet computers and mobile phones and such electronic devices are widely used on a regular basis in our daily life. The types of electronic devices and their functions are becoming more and more diverse, and the convenience and practicality is making these electronic devices more popular.

Generally, a framework is disposed inside of an electronic device to provide the supporting strength needed by the electronic device. In addition, a central processing unit (CPU), a processing chip and other electronic components are disposed in the electronic device, and such electronic components produce heat energy when in operation. However, along with the volume of electronic devices becoming smaller and smaller and the arrangements of the electronic components being more and more dense, a problem of heat accumulating in the electronic device is becoming more and more difficult to deal with and often causes an electronic device to crash due to heat. Therefore, improving heat dissipation is becoming more and more important.

SUMMARY OF THE INVENTION

The invention provides an electronic device having good heat dissipation effect.

An electronic device of the invention includes a case having a space, a circuit board disposed in the space, a heat source disposed on the circuit board and a vapor chamber disposed at a side of the circuit board and adjacent to the heat source. The vapor chamber includes an upper sheet, a bottom sheet assembled with the upper sheet to form a chamber, and a working fluid disposed in the chamber.

Based on the above, an electronic device of the invention uses a vapor chamber to effectively dissipate heat accumulated in the electronic device, extending the service life of the electronic device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
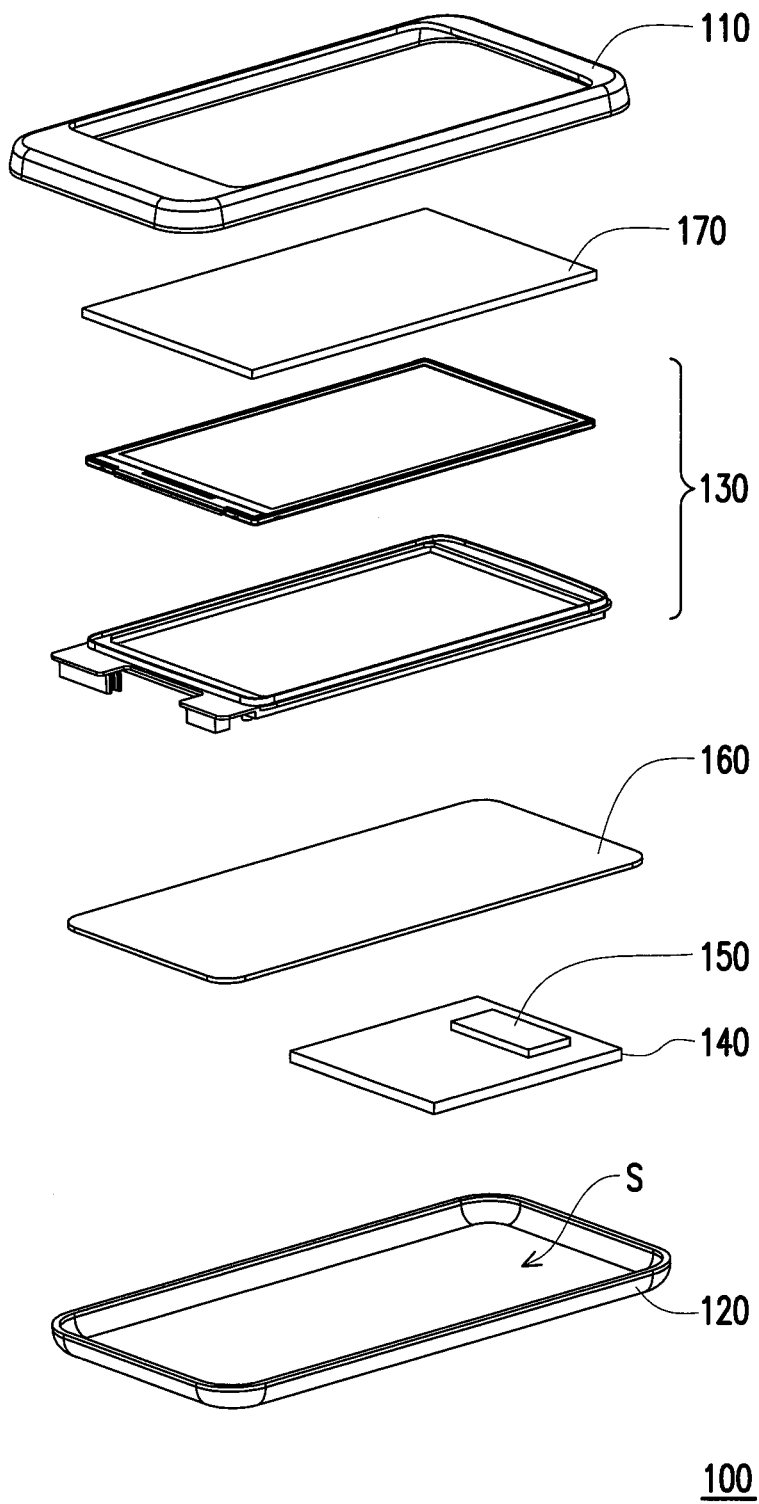
FIG. 1 is an exploded schematic diagram of an electronic device of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
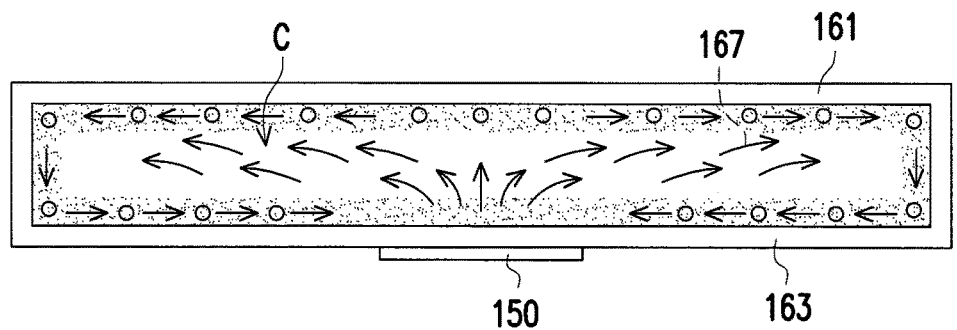
FIG. 2 is a schematic diagram of a vapor chamber.

FIG. 1 is an exploded schematic diagram of an electronic device of the invention. FIG. 2 is a schematic diagram of a vapor chamber. Referring to FIG. 1 and FIG. 2, an electronic device 100, for example, is a smart phone or a tablet computer, and includes a case 120 having a space S, a circuit board 140 disposed in the space S, a heat source 150 disposed on the circuit board 140 and a vapor chamber 160 disposed at a side of the circuit board 140 and adjacent to the heat source 150.

In an embodiment of the invention, the case 120, for example, is a back cover of the electronic device 100, and the electronic device 100 may further include a front cover assembled together with the case 120, and the above mentioned circuit board 140, the heat source 150 and the vapor chamber 160 are encapsulated between the front cover 110 and the case 120.

The vapor chamber 160 includes at least an upper sheet 161, a bottom sheet 163 assembled together with the upper sheet 161, a chamber C formed between the upper sheet 161 and the bottom sheet 163 and a working fluid 167 disposed in the chamber C. A capillary structure is disposed on an inner surface of at least one of the upper sheet 161 or the bottom sheet 163, in which the capillary structure may be formed by sintering powder or etching process. In addition, the vapor chamber 160 may be formed from a material having a stiffness coefficient between 200 HB and 500 HB and a heat transfer coefficient between 15 W/(m·K) and 120 W/(m·K), stainless steel for example. In order to achieve an anti-rust effect, an anti-rust additive is added to the working fluid 167 in the vapor chamber 160 in addition to pure water, wherein the ratio of pure water to additive is 1:1 to 2:1, and the additive, for example, is Ethylene Glycol, Diethylene Glycol, Propylene Glycol, nitrate, sulphate, tolytriazole, polytriazole or mercapten benzenthiazole, and may be selected according to actual requirements. In another embodiment, the vapor chamber 160 may further include a side plate surrounding a periphery of the upper sheet 161 and the bottom sheet 163 to co-construct the chamber C.

Figure 3:
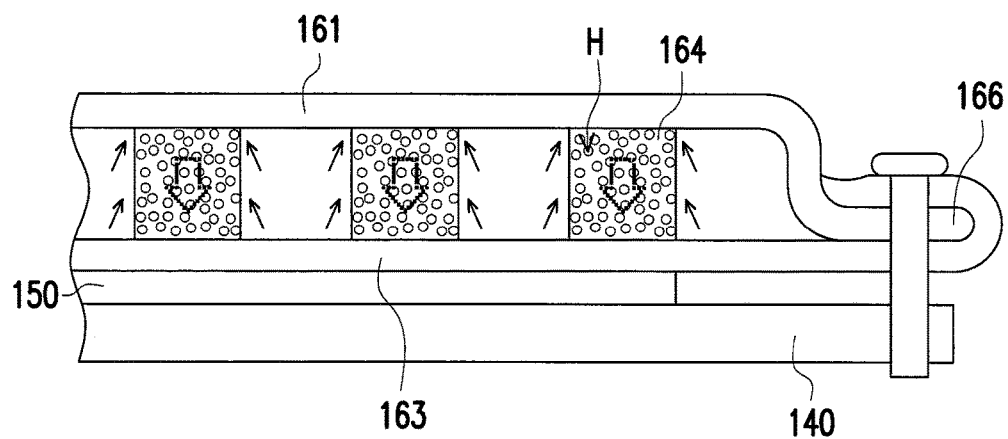
FIG. 3 is a schematic diagram of a flow of a working fluid in the vapor chamber with a heat source, a vapor chamber and a circuit board assembled together.

FIG. 3 is a schematic diagram of a flow of a working fluid in the vapor chamber with a heat source, a vapor chamber and a circuit board assembled together. Referring to FIG. 2 and FIG. 3, the vapor chamber 160 may further include a plurality of support components 164. The support components 164 are disposed in the chamber C and contact the upper sheet 161 and the bottom sheet 163, to maintain a gap between the upper sheet 161 and the bottom sheet 163. The support components 164 may have a plurality of apertures H, and the working fluid 167 may flow in the chamber C by the plurality of apertures passing through the support components 164. The vapor chamber 160 further has a fixing part 166, and the circuit board 140 is assembled together with the vapor chamber 160 by the fixing part 166 by lock attaching, embedding, bonding and such methods.

Referring to FIG. 2 and FIG. 3, the vapor chamber 160 of the present embodiment is disposed directly contacting the heat source 150, and the area of the vapor chamber 160 is greater than the area of the heat source 150. Therefore, the orthographic projection of the heat source 150 on the vapor chamber 160 is located completely in the vapor chamber 160. However, in other embodiments, the heat source 150 may overlap only partially with the vapor chamber 160, and similarly may also achieve an objective for allowing the heat source 150 to dissipate heat by the vapor chamber 160; the invention is not limited thereto.

Taking into consideration that the heights of the heat sources 150 are not necessarily the same causing the vapor chamber 160 to have difficulty contacting every heat source 150 at the same time, in other possible embodiments, the vapor chamber 160 may be disposed directly contacting the circuit board 140 to provide a heat dissipation path with a large area, and therefore a good heat dissipating effect is also achieved.

In the above mentioned embodiments, the length and width dimensions of the vapor chamber 160 are close to the length and width dimensions of the case 120 and have sufficient strength and stiffness. Therefore, a framework is not required to be additionally disposed at the periphery of the vapor chamber 160 to auxiliary reinforce the strength or stiffness of the vapor chamber 160.

Referring to FIG. 1, FIG. 2 and FIG. 3, the bottom sheet 163 of the vapor chamber 160 contacts the heat source 150 and the upper sheet 161 of the vapor chamber 160 is further away from the heat source 150 relatively. When the electronic device 100 is used, the heat of the heat source 150 is transmitted to the vapor chamber 160, and the working fluid 167 that is closer to the heat source 150 is subjected to thermal evaporation and becomes gas and flows upwards filling the entire chamber C. When the working fluid 167 which evaporated flows to a spot relatively further away from the heat source 150, wherein the temperature at the spot relatively further away from the heat source 150 is lower than the temperature at a spot that is relative close to the heat source 150, it refluxes via the capillary phenomenon caused by the capillary structure after hot air performs heat exchange with other mediums (such as a capillary structure, the upper sheet 161 or cold air and the like) and condenses into a liquid. The reflux of the liquid may pass through the support components 164 having a plurality of apertures H or along the side wall (not labelled) of the upper sheet 161 and reflux to a lower spot (namely relatively closer to the heat source 150) in the chamber C. This type of evaporation and condensation operation will be carried out repeatedly in the chamber C, therefore the vapor chamber 160 may dissipate out the heat emitted by the heat source 150 effectively, preventing the accumulation of heat in the electronic device 100, such that the electronic device 100 may operate for an extended amount of time without crashing due to heat. At the same time the life of the electronic device 100 is extended.

Comparing with a vapor chamber not using a support component, the speed of the reflux in the vapor chamber 160 of the present embodiment is increased due to the support components 164 being used have a plurality of apertures H, in which the apertures H of the support components 164 may be regarded as a capillary structure and may provide capillary action such that the vapor chamber 160 using the support components 164 having a plurality of apertures H have a increased heat dissipating effect.

Figure 4:
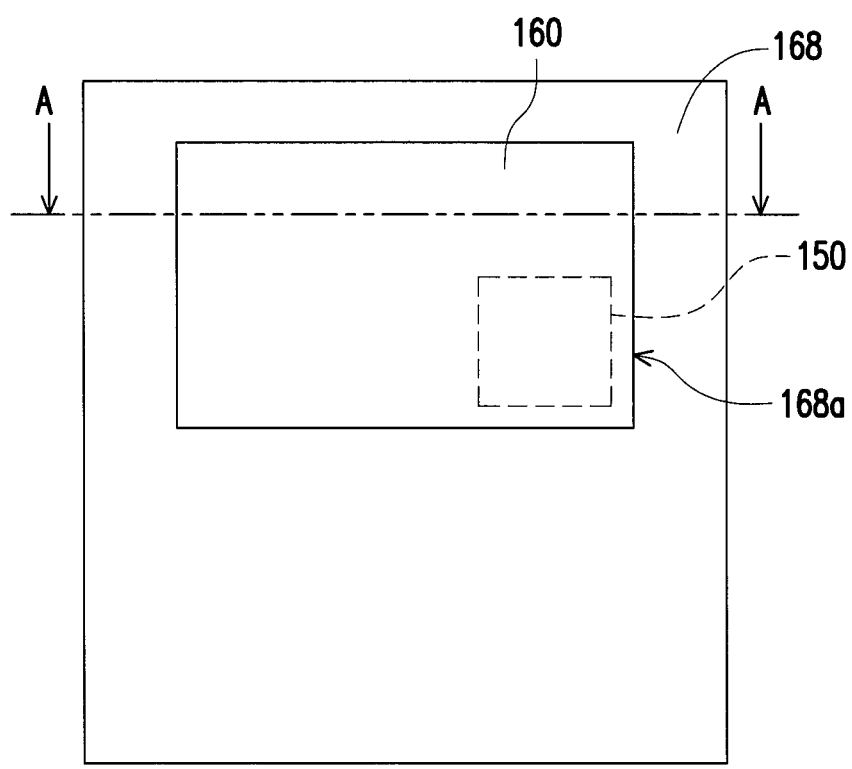
FIG. 4 is a schematic diagram of a vapor chamber with a framework disposed at the periphery.
Figure 5:
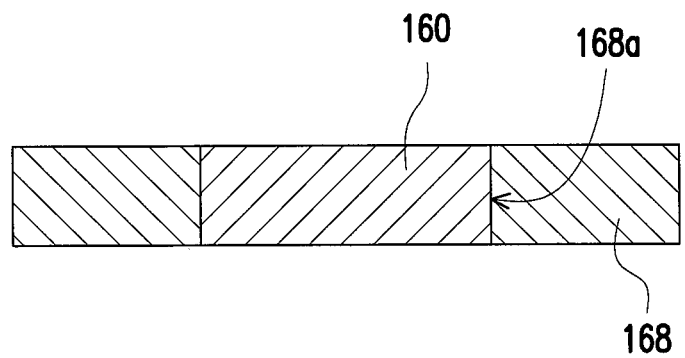
FIG. 5 is a schematic diagram of the inside of a via hole of a framework disposed at the vapor chamber along the sectional line A-A of FIG. 4.
Figure 6:
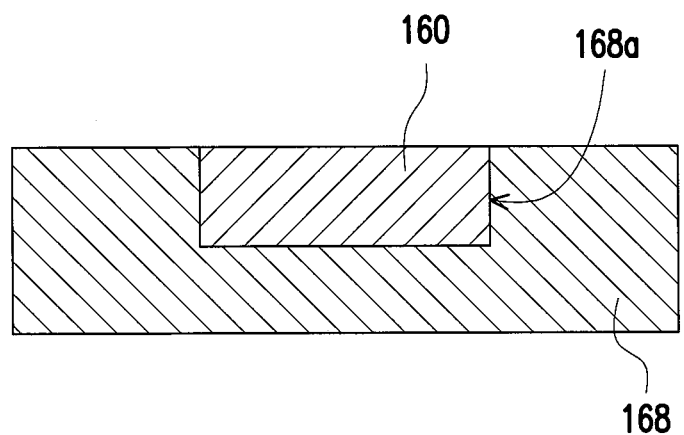
FIG. 6 is a schematic diagram of the inside of a blind hole of a framework disposed at the vapor chamber along the sectional line A-A of FIG. 4.

FIG. 4 is a schematic diagram of a vapor chamber with a framework disposed at the periphery. FIG. 5 is a schematic diagram of the inside of a via hole of a framework disposed at the vapor chamber along the sectional line A-A of FIG. 4. Referring to FIG. 1, FIG. 4 and FIG. 5, in another type of embodiment, when the length and width dimensions of the vapor chamber 160 is smaller than the length and width dimensions of the case 120, the electronic device 100 may include a framework 168. The framework 168 has an opening 168a, and the vapor chamber 160 is located in the opening 168a. The opening 168a is an opening penetrating the upper and lower surfaces of the framework 168. Or, the opening 168a may be a blind hole, as shown in FIG. 6, wherein FIG. 6 is a schematic diagram of the inside of a blind hole of a framework disposed at the vapor chamber along the sectional line A-A of FIG. 4. The framework 168 may be used to increase the overall strength of the electronic device 100. A material of the above mentioned framework 168 may be selected according to requirements, for example, metal is selected to form the framework 168 to auxiliary increase the heat dissipating effect of the vapor chamber 160; or plastic may be selected to form the framework 168 at the periphery of the vapor chamber 160 using a dual injection method.

Furthermore, the electronic device 100 may further include a display module 130. The display module 130 in the present embodiment is located between the front cover 110 and the vapor chamber 160. But in other possible embodiments, the electronic device 100 may not include the front cover 110, and the display module 130 may be made to have a front cover function to be assembled together with the case 120 and cover the space S. Also, the control of many of the current smart phones and tablet computers are performed by a touch screen method. Therefore, the electronic device 100 of the present embodiment may also further include a touch pad module 170 disposed between the front cover 110 and the display module 130, for the convenience of a user to touch the touch pad module 170 with fingers to control the electronic device 100.

In summary, the electronic device of the invention uses a vapor chamber to provide a heat source with a heat dissipation path with a larger area, and therefore a problem that heat accumulated in the electronic device caused by the heat source is solved. In addition, even if a plurality of heat sources are disposed densely in the electronic device, a good heat dissipation effect may be achieved through an increased area of the vapor chamber.

In addition, while the vapor chamber and the circuit board are assembled together, the vapor chamber has sufficient stiffness to provide the electronic device with sufficient supporting strength, and thus a conventional framework, which also provides the same function, can be replaced. Therefore, an additional framework does not need to be disposed in the electronic device and the overall thickness of the electronic device may be maintained and will not be increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
a case, having a space;
a circuit board, disposed in the space;
at least one heat source, disposed on the circuit board;
a vapor chamber, disposed at a side of the circuit board, and adjacent to the at least one heat source, the vapor chamber comprising:
an upper sheet;
a bottom sheet, assembled with the upper sheet to form a chamber; and
a working fluid, disposed in the chamber, wherein the vapor chamber further comprises a plurality of support components, disposed in the chamber and perpendicularly contacting the upper sheet and the bottom sheet, to maintain a gap between the upper sheet and the bottom sheet; and
a framework and the vapor chamber assembled to the framework, wherein the framework hag an opening and the vapor chamber is located in the opening, wherein the support components have a plurality of apertures configured to allow the working fluid to flow through.

2. The electronic device as claimed in claim 1, wherein an orthographic projection of the heat source on the vapor chamber s located completely in the vapor chamber.

3. The electronic device as claimed in claim 1, wherein the vapor chamber contacts the heat source.

4. The electronic device as claimed in claim 1, wherein the vapor chamber further has a fixing part, and the circuit board is fixed to the fixing part.

5. The electronic device as claimed in claim 1, wherein a material of the framework is plastic, and is formed at the periphery of the vapor chamber using a dual injection method.

6. The electronic device as claimed in claim 1, wherein a material of the framework is metal.

7. The electronic device as claimed in claim 1, wherein the vapor chamber has a stiffness coefficient between 200 HB and 500 HB and a heat transfer coefficient between 15 W/(m·K) and 120 W/(m·K).

8. The electronic device as claimed in claim 1, wherein a capillary structure is disposed on an inner surface of at least one of the upper sheet or the bottom sheet.

9. The electronic device as claimed in claim 8, wherein the capillary structure is formed by sintering powder or an etching process.

10. The electronic device as claimed in claim 1, wherein the working fluid comprises pure water and an additive.

11. The electronic device as claimed in claim 10, wherein a ratio of pure water to additive is 1:1 to 2:1.

12. The electronic device as claimed in claim 10, wherein the additive is Ethylene Glycol, Diethylene Glycol, Propylene Glycol, nitrate, sulphate, tolytriazole, polytriazole or mercapten benzenthiazole.

13. The electronic device as claimed in claim 1, further comprising a display module, assembled to the case and covering the space.

* * * * *